(12) United States Patent
Okada et al.

(10) Patent No.: US 11,373,416 B2
(45) Date of Patent: Jun. 28, 2022

(54) IMAGE PROCESSING DEVICE AND IMAGE PROCESSING METHOD (71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 398 days.

(21) Appl. No.: 16/574,529

(22) Filed: Sep. 18, 2019

(65) Prior Publication Data
US 2020/0193191 A1 Jun. 18, 2020

(30) Foreign Application Priority Data

Dec. 14, 2018 (JP) .............................. JP2018-234802

(51) Int. Cl.
G06V 20/58 (2022.01)
G06V 10/44 (2022.01)
G06V 10/50 (2022.01)
G06V 10/20 (2022.01)

(52) U.S. Cl.
CPC .......... G06V 20/586 (2022.01); G06V 10/255 (2022.01); G06V 10/44 (2022.01); G06V 10/50 (2022.01)

(58) Field of Classification Search
None
See application file for complete search history.

(56) References Cited

U.S. PATENT DOCUMENTS

| 9,361,529 | B2 | 6/2016 | Ryu et al. |
| 9,536,155 | B2 | 1/2017 | Takemae |
| 9,721,460 | B2 | 8/2017 | Takemura et al. |
| 10,311,731 | B1 | 6/2019 | Li et al. |
| 10,373,226 | B1 | 8/2019 | Russell et al. |
| 2002/0087253 | A1 | 7/2002 | Jeon |
| 2003/0128106 | A1 | 7/2003 | Ross |
| 2003/0222983 | A1 | 12/2003 | Nobori et al. |

(Continued)

FOREIGN PATENT DOCUMENTS

| CN | 203318408 U | 12/2013 |
| CN | 102834309 B | 12/2016 |

(Continued)

OTHER PUBLICATIONS

May 19, 2021 Office Action issued in U.S. Appl. No. 16/574,395.

(Continued)

*Primary Examiner* — Edward Park
(74) *Attorney, Agent, or Firm* — Oliff PLC (57) ABSTRACT

An image processing device includes: a detection unit which detects a target object based on edge information acquired from image data; and a judging unit which judges whether a certain region in the image data is an improper region that is not suitable for detection of the target object based on an edge pattern of edge information in the certain region and a feature pattern indicating a feature of the target object, and the detection unit detects the target object excluding a region that has been judged to be the improper region by the judging unit.

17 Claims, 8 Drawing Sheets

(56) References Cited

U.S. PATENT DOCUMENTS

| | | |
|---|---|---|
| 2004/0254720 A1 | 12/2004 | Tanaka et al. |
| 2006/0080035 A1 | 4/2006 | Daubert et al. |
| 2008/0109120 A1 | 5/2008 | Sawamoto |
| 2009/0243889 A1 | 10/2009 | Suhr et al. |
| 2009/0278709 A1 | 11/2009 | Endo et al. |
| 2010/0049402 A1 | 2/2010 | Tanaka |
| 2010/0195901 A1 | 8/2010 | Andrus et al. |
| 2010/0318467 A1 | 12/2010 | Porter et al. |
| 2011/0006917 A1 | 1/2011 | Taniguchi et al. |
| 2012/0106802 A1* | 5/2012 | Hsieh .................. G06K 9/3258 382/105 |
| 2013/0027557 A1 | 1/2013 | Hirai et al. |
| 2013/0266188 A1 | 10/2013 | Bulan et al. |
| 2014/0355822 A1 | 12/2014 | Choi et al. |
| 2015/0130640 A1 | 5/2015 | Ryu et al. |
| 2015/0254981 A1 | 9/2015 | Tachibana et al. |
| 2015/0294163 A1 | 10/2015 | Sakamoto |
| 2015/0317526 A1 | 11/2015 | Muramatsu et al. |
| 2015/0344028 A1 | 12/2015 | Gieseke et al. |
| 2016/0039409 A1 | 2/2016 | Hayakawa et al. |
| 2016/0093214 A1 | 3/2016 | Wu et al. |
| 2016/0107689 A1 | 4/2016 | Lee |
| 2016/0272244 A1 | 9/2016 | Imai et al. |
| 2016/0304088 A1 | 10/2016 | Barth |
| 2017/0032681 A1 | 2/2017 | Tomozawa et al. |
| 2017/0085790 A1 | 3/2017 | Bohn |
| 2018/0012082 A1 | 1/2018 | Satazoda et al. |
| 2018/0095474 A1 | 4/2018 | Batur et al. |
| 2018/0099661 A1 | 4/2018 | Bae et al. |
| 2018/0162446 A1 | 6/2018 | Mikuriya et al. |
| 2018/0215413 A1 | 8/2018 | Inagaki |
| 2018/0307919 A1 | 10/2018 | Hayakawa |
| 2018/0307922 A1 | 10/2018 | Yoon et al. |
| 2018/0345955 A1 | 12/2018 | Kim et al. |
| 2019/0073902 A1 | 3/2019 | Indoh et al. |
| 2019/0075255 A1 | 3/2019 | Matsumoto et al. |
| 2019/0094871 A1 | 3/2019 | Sugano |
| 2019/0370572 A1 | 12/2019 | Nagpal et al. |
| 2020/0062242 A1 | 2/2020 | Hayakawa |
| 2020/0074192 A1 | 3/2020 | Ogata et al. |
| 2020/0104613 A1 | 4/2020 | Hirai |
| 2020/0117927 A1 | 4/2020 | Oba |
| 2020/0118310 A1 | 4/2020 | Matsumoto et al. |
| 2020/0175634 A1 | 6/2020 | Aggarwala et al. |
| 2020/0193643 A1 | 6/2020 | Hess et al. |
| 2020/0398827 A1 | 12/2020 | Hara |
| 2021/0180954 A1 | 6/2021 | Hiyokawa et al. |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 20170102192 A | 9/2017 |
| WO | 03058163 A1 | 7/2003 |
| WO | 2005/081941 A2 | 9/2005 |
| WO | 2010116922 A1 | 10/2010 |
| WO | 2014/084118 A1 | 6/2014 |
| WO | 2017/068699 A1 | 4/2017 |

OTHER PUBLICATIONS

Mar. 30, 2021 Office Action issued in U.S. Appl. No. 16/574,516.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
Apr. 6, 2021 Office Action issued in U.S. Appl. No. 16/574,507.
Jun. 30, 2020 Notice of Allowance issued in U.S. Appl. No. 16/574,546.
U.S. Appl. No. 16/574,395, filed Sep. 18, 2019 in the name of Yasutaka Okada et al.
U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Jun. 24, 2021 Notice of Allowance issued in U.S. Appl. No. 16/574,499.
Jul. 13, 2021 Notice of Allowance issued in U.S. Appl. No. 16/574,516.
Aug. 3, 2020 Office Action issued in U.S. Appl. No. 16/574,598.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
Suhr et al., "Automatic Parking Space Detection and Tracking for Underground and Indoor Environments" IEEE Transactions on Industrial Electronics. (Year: 2016).
K Hamada et al., "Surround View Based Parking Lot Detection and Tracking." IEEE Intelligent Vehicles Symposium. (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year 2018).
Jul. 20, 2021 Notice of Allowance issued in U.S. Appl. No. 16/574,507.
Sep. 29, 2020 Office Action issued in U.S. Appl. No. 16/574,391.
Reinhard et al., Photographic Tone Reproduction for Digital Images (2002), ACM Transactions on Graphics, 2,4, 217-236 (Year: 2002).
Feb. 2, 2021 Office Action issued in U.S. Appl. No. 16/574,422.

* cited by examiner

VEHICLE MOVEMENT DIRECTION

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234802 filed on Dec. 14, 2018.

TECHNICAL FIELD

The present invention relates to an image processing device and an image processing method.

BACKGROUND ART

In recent years, with the development of autonomous drive techniques, image processing devices for detecting a parking frame in which to park a vehicle on the basis of image data taken by shooting a neighborhood of the vehicle have been coming into wide use. Image processing devices of this type detect partition lines of a parking frame on the basis of image data and detect the parking frame on the basis of the detected partition lines (refer to JP-A-2017-87758, for example).

SUMMARY OF INVENTION

However, in conventional techniques, there may occur, for example, an event that erroneous partition lines are detected successively from a region from which true partition lines existing in image data are difficult to detect, resulting in increase of the processing load and erroneous detection of partition lines.

The present invention has been made in view of the above circumstances, and an object of the invention is therefore to provide an image processing device and an image processing method capable of suppressing erroneous detection of a target object while lowering the processing load.

The image processing device according to the embodiment is equipped with a detection unit and a judging unit. The detection unit detects a target object on the basis of edge information acquired from image data. The judging unit judges whether a certain region in the image data is an improper region that is not suitable for detection of the target object on the basis of an edge pattern of edge information in the certain region and a feature pattern indicating a feature of the target object. The detection unit detects the target object excluding the region that has been judged to be an improper region by the judging unit.

The invention makes it possible to suppress erroneous detection of a target object while lowering the processing load.

DETAILED DESCRIPTION OF THE INVENTION

An image processing device 1 and an image processing method according to an embodiment will be hereinafter described in detail with reference to the accompanying drawings. The present invention is not limited by the embodiment.

Figure 1A:
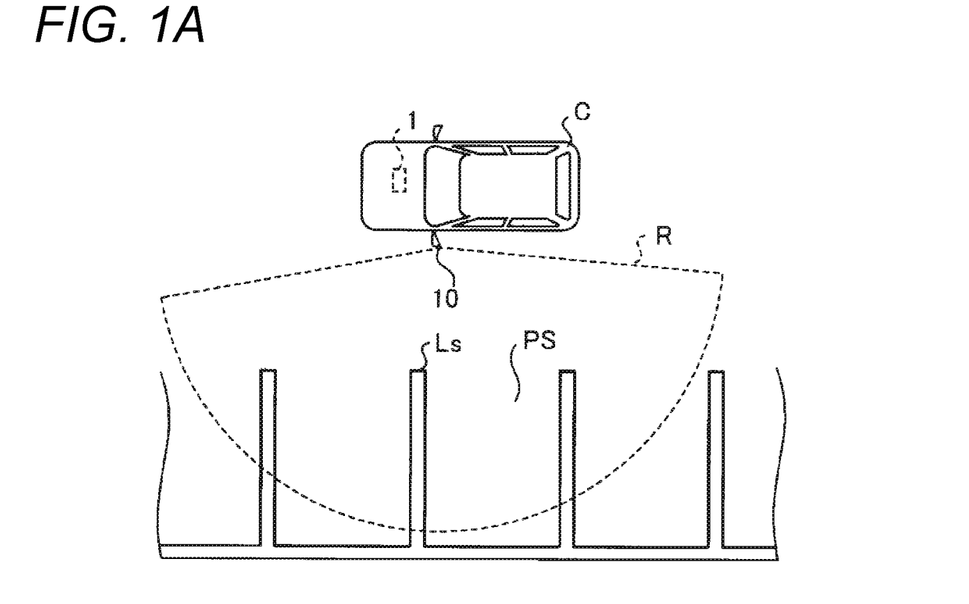
FIG. 1A shows an example manner of installation of an image processing device according to an embodiment.
Figure 1B:
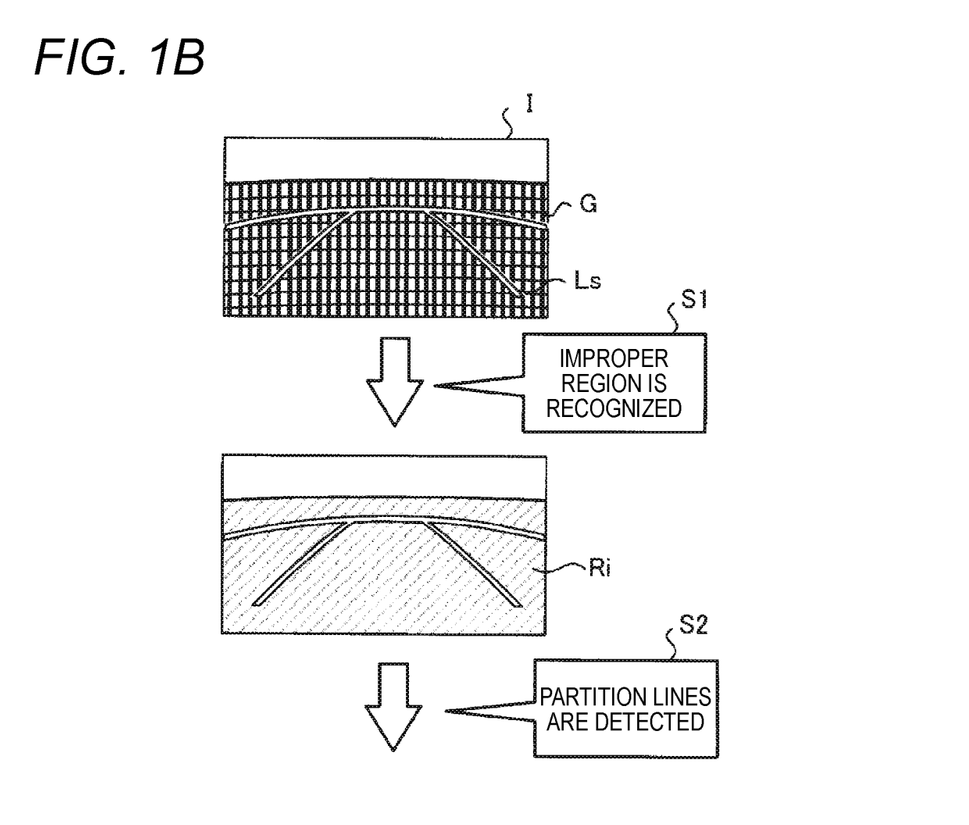
FIG. 1B outlines an image processing method according to the embodiment.

First, the image processing device 1 according to the embodiment will be outlined with reference to FIGS. 1A and 1B. FIG. 1A shows an example manner of installation of the image processing device 1 and FIG. 1B outlines the image processing method. The image processing method is performed by the image processing device 1 shown in FIG. 1A. Although the following description will be directed to a case that detection targets of the image processing device 1 are partition lines, the detection targets are not limited to partition lines and may be desired ones.

As shown in FIG. 1A, the image processing device 1 is installed in a vehicle C, detects partition lines Ls on the basis of image data taken by a vehicular camera 10, and detects a parking frame PS on the basis of the detected partition lines Ls.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

The image processing device 1 detects partition lines Ls that partition a parking frame PS on the basis of edge lines each of which is a connection of edge points that are obtained by performing edge processing on image data I. However, where image data I includes, for example, a very large number of patterns similar to a partition line Ls, such as a grating, it is difficult to detect partition lines Ls from the image data I. Furthermore, when partition lines Ls are detected sequentially, this may cause increase of the processing load or erroneous detection of partition lines Ls.

In view of the above, in the image processing device 1 according to the embodiment, an improper region that is not suitable for detection of a partition line Ls is set and detection of a partition line Ls is not performed in the improper region. That is, in the image processing device 1, if a certain region of image data I includes many feature patterns that exhibit features of a partition line Ls, this region is judged to be an improper region.

More specifically, if as shown in FIG. 1B image data I includes a grating G, it is difficult to discriminate between the grating and partition lines Ls. To solve this problem, at step S1, the image processing device 1 recognizes, as an improper region Ri, a grating region that includes a grating.

The image processing device 1 can recognize a grating region paying attention to the fact that edge lines in the grating region are approximately perpendicular to or parallel with each other. Edge lines corresponding to true partition lines Ls are also approximately perpendicular to or parallel with each other.

That is, edge lines in a grating region and edge lines corresponding to true partition lines Ls exhibit similar patterns. On the other hand, more such patterns are detected in a grating region than in true partition lines Ls.

Thus, the image processing device 1 recognizes, as a grating region, a region where a very large number of edge line patterns exist that are approximately perpendicular to or parallel with each other and judges it to be an improper region Ri.

At step S2, the image processing device 1 detects, sequentially, partition lines Ls excluding the improper region Ri. That is, the image processing device 1 detects, sequentially, partition lines Ls excluding the improper region Ri. In the example shown in FIG. 1B, the detection of partition lines Ls is suspended because the partition lines Ls are included in the improper region Ri.

As described above, the image processing device 1 judges whether a certain region of image data I is an improper region Ri on the basis of a feature pattern indicating a feature of a partition line Ls.

Since the image processing device 1 does not detect partition lines Ls in an improper region Ri, the processing load can be lowered by an amount corresponding to the improper region Ri. Furthermore, erroneous detection of a partition line Ls in an improper region Ri can be prevented by setting the improper region Ri in advance.

Although the case that the image processing device 1 recognizes an improper region Ri on the basis of edge line patterns has been described above, it is also possible to recognize an improper region Ri on the basis of edge point patterns. This will be described later in detail.

Figure 2:
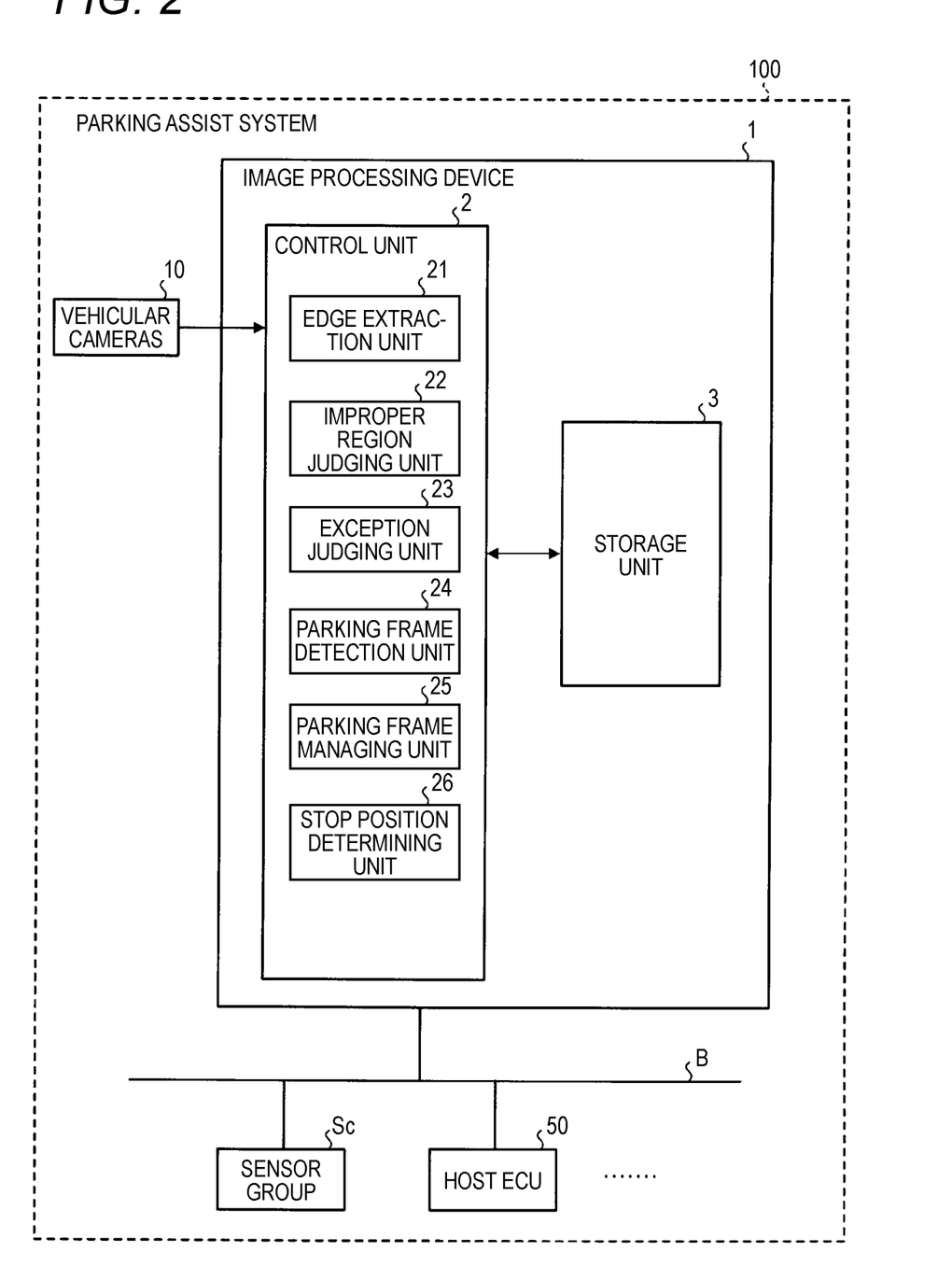
FIG. 2 is a block diagram of a parking support system including the image processing device according to the embodiment.

Next, an example configuration of the image processing device 1 according to the embodiment will be described with reference to FIG. 2. FIG. 2 is a block diagram of a parking assist system 100 including the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B of the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C in a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with an edge extraction unit 21, an improper region judging unit 22, an exception judging unit 23, a parking frame detection unit 24, a parking frame managing unit 25, and a stop position determining unit 26.

For example, the control unit 2 includes a computer having a CPU (central processing unit), a ROM (read-only memory), a RAM (random access memory), an HDD (hard disk drive), an input/output port, etc., and other various kinds of circuits.

The CPU of the computer functions as the edge extraction unit 21, the improper region judging unit 22, the exception judging unit 23, the parking frame detection unit 24, the parking frame managing unit 25, and the stop position determining unit 26 by running programs that are stored in the ROM, for example.

All or part of the edge extraction unit 21, the improper region judging unit 22, the exception judging unit 23, the parking frame detection unit 24, the parking frame managing unit 25, and the stop position determining unit 26 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame detection process (described later) either in the case where the vehicle C is considered to be running in a parking lot (e.g., the vehicle speed is lower than or equal to 30 km/h) or during all the period when the vehicle C is running.

The edge extraction unit 21 extracts edge information on the basis of the luminance of each of pixels of image data that is input from a vehicular camera 10. More specifically, the edge extraction unit 21 converts the image data received from the vehicular camera 10 into a grayscale image. Grayscaling is processing of converting the value of each pixel of image data into one of prescribed gradation levels of white to black (e.g., 256 gradation levels) according to its luminance.

Then the edge extraction unit 21 projects the gray scale image onto a projection surface such as a road surface on the basis of a position and an angle of attachment of the vehicular camera 10 to the vehicle C. The edge extraction unit 21 thus obtains a planar image of the gray scale image. The edge extraction unit 21 thereafter calculates edge intensity and a luminance gradient of each pixel by, for example, applying a Sobel filter to the planar image.

Then the edge extraction unit 21 extracts edge points by extracting pixels whose edge intensity values are larger than a prescribed value and extract edge lines by connecting adjacent edge points. The edge extraction unit 21 communicates edge information relating to the extracted edge points and edge lines to the improper region judging unit 22.

The improper region judging unit 22 judges, on the basis of the edge points and edge lines extracted by the edge extraction unit 21, presence/absence of an improper region where detection of a partition line to constitute a parking frame is difficult. The improper region judging unit 22 detects partition line candidates (i.e., candidates for partition lines) on the basis of the edge lines, generates partition line information relating to the partition line candidates, and communicates it to the exception judging unit 23. A specific example of the improper region judging unit 22 will be described later with reference to FIG. 3.

The exception judging unit 23 judges presence/absence of a parking prohibition region where parking of the vehicle C is not permitted, on the basis of the partition line candidates detected by the improper region judging unit 22. For example, the exception judging unit 23 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 23 can judge presence/absence of a partition line candidate(s) that is not necessary for detection of a parking frame, such as (part of) a road surface marking. For example, the exception judging unit 23 can detect a road surface marking contained in image data by matching partition line candidates detected by the improper region judging unit 22 with template models of road surface markings.

The exception judging unit 23 eliminates unnecessary partition line candidates from the partition line information, adds information indicating the parking prohibition region to the partition line information, and communicates the resulting partition line information to the parking frame detection unit 24.

The parking frame detection unit 24 detects a parking frame on the basis of the partition line candidates detected by the improper region judging unit 22. More specifically, the parking frame detection unit 24 detects, as part of a parking frame, partition line candidates that are arranged parallel with each other with a prescribed interval.

The prescribed interval is a width of a standard parking region for common or public use that is prescribed in, for example, a law relating to parking lots. At this time, the parking frame detection unit 24 detects a parking frame so as to exclude the parking prohibition region determined by the exception judging unit 23.

That is, the parking frame detection unit 24 detects a parking frame so as to exclude a zebra zone or the like. Upon detecting the parking frame, the parking frame detection unit 24 communicates parking frame information relating to the detected parking frame to the parking frame managing unit 25. In the following, partition line candidates detected as constituting a parking frame will be referred to as "partition lines." Each piece of partition line information includes apex coordinates of each partition line with reference to the vehicle C.

The parking frame managing unit 25 subjects the partition frame information of the parking frame detected by the parking frame detection unit 24 to time-series management.

The parking frame managing unit 25 can estimate a movement distance of the vehicle C on the basis of sensor values received from the sensor group Sc and estimate current apex coordinates of each partition line on the basis of the movement distance and past partition frame information.

Furthermore, the parking frame managing unit 25 can update the coordinate information of each partition line of past partition frame information on the basis of newly received partition frame information. That is, the parking frame managing unit 25 updates the relative positional relationship between the vehicle C and the parking frame at such occasions as the vehicle C moves.

Still further, it is also possible for the parking frame managing unit 25 to set a parking frame detection range with an assumption that plural parking frames are arranged continuously. For example, the parking frame managing unit 25 assumes that plural parking frames exist continuously including one parking frame (reference parking frame) detected by the parking frame detection unit 24.

And the parking frame managing unit 25 sets the thus-assumed range of the plural parking frames as a detection range. With this measure, it suffices for the above-described edge extraction unit 21 to perform edge line detection processing only in the detection range set by the parking frame managing unit 25, whereby the processing load of the control unit 2 can be reduced.

The stop position determining unit 26 determines a stop position of the vehicle C, that is, a parking position in the parking frame, on the basis of the edge lines detected by the edge extraction unit 21. For example, the stop position determining unit 26 determines a stop position of the vehicle C by detecting a sprag(s) or curb, a wall, a white line extending in the vehicle width direction, or the like on the basis of the edge lines detected by the edge extraction unit 21. That is, the stop position determining unit 26 determines a stop position on the basis of a partition line Ls or the like located at deep position in the parking frame PS and extending in the width direction of the vehicle C.

When detecting sprags, the stop position determining unit 26 determines a stop position so that the bottom portions of the rear wheels of the vehicle C will be located just in front of the sprags. When detecting a white line, a wall, or the like rather than sprags, the stop position determining unit 27 determines a stop position so that the rear end (e.g., the end of the rear bumper) of the vehicle C will be located just in front of it.

Figure 3:
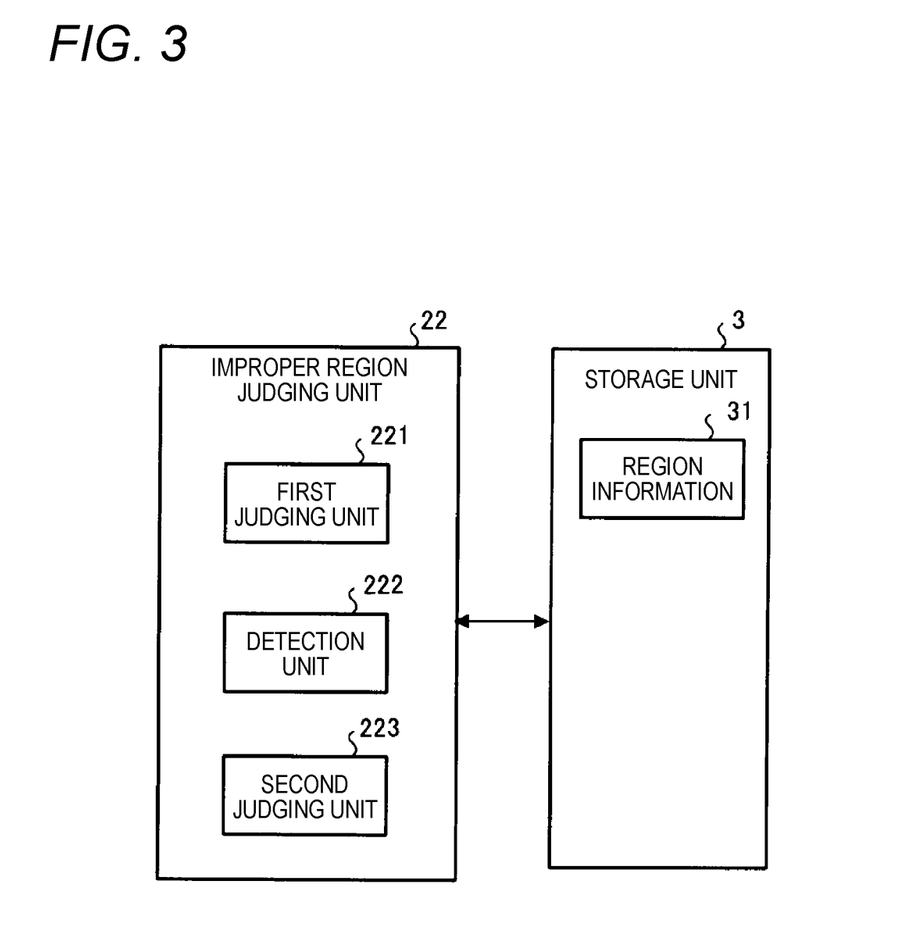
FIG. 3 is a block diagram of an improper region judging unit.

Next, an example configuration of the improper region judging unit 22 will be described with reference to FIG. 3. FIG. 3 is a block diagram of the improper region judging unit 22. As shown in FIG. 3, the improper region judging unit 22 is equipped with a first judging unit 221, a detection unit 222, and a second judging unit 223.

When the improper region judging unit 22 recognizes an improper region, the storage unit 3 stores region information 31 which is information relating to coordinates of a region that has been judged to be an improper region.

The first judging unit 221 recognizes an improper region on the basis of a distribution pattern of edge points and a dispersion pattern of luminance gradients of respective edge points. More specifically, the first judging unit 221 divides image data I into grid-like regions and recognizes an improper region Ri on the basis of densities of edge points P (hereinafter referred to as "edge densities") in the respective regions. The edge density is an example of a distribution pattern of edge points.

Figure 4A:
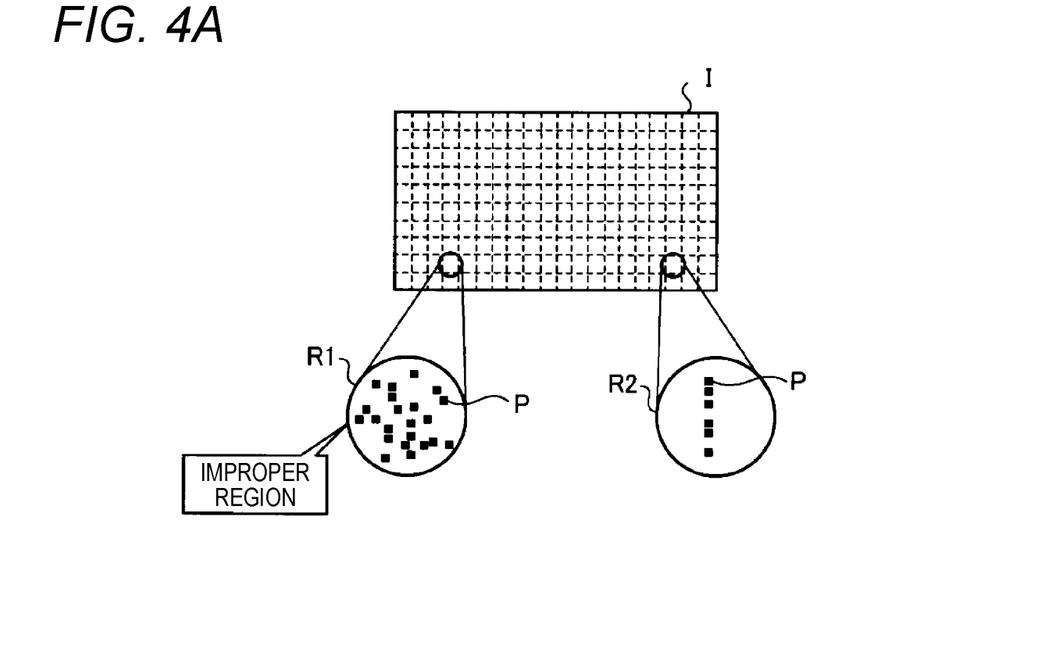
FIG. 4A shows an example of how an improper region is recognized on the basis of edge densities

FIG. 4A shows an example of how an improper region Ri is recognized on the basis of an edge density, and shows a specific example of processing performed by the first judging unit 221. As shown in FIG. 4A, the first judging unit 221 divides image data I into grid-like regions and makes an improper region judgment for each region on the basis of a distribution pattern of edge points P in each region, that is, the number of edge points P in each region.

More specifically, the first judging unit 221 judges that a region in which the density of edge points is higher than a prescribed value is an improper region. This is because when gravel exists on a road surface or its pavement is rough, road surface noise is extracted as edge points P in a number that is larger than the number of edge points P corresponding to a true partition line.

The prescribed value that is a threshold value for judgment of the level of density of edge points P is set in advance according to the density of edge points P of a true partition line.

That is, the first judging unit 221 recognizes an improper region Ri on the basis of the fact that a feature pattern of edge points P of a true partition line (i.e., the density of edge points P of a true partition line) and a pattern of edge points P produced by noise (i.e., the density of edge points P produced by noise) are different from each other. In the example shown in FIG. 4A, the density of edge points P in a region R1 is higher than the prescribed value and the density of edge points P in a region R2 is lower than the prescribed value.

Thus, the first judging unit 221 judges that the region R1 is an improper region Ri and the region R2 is not. It is therefore possible to eliminate the edge points P in the improper region Ri from detection of a partition line and hence to lower the processing load of each downstream stage by an amount corresponding to the eliminated edge points P.

Figure 4B:
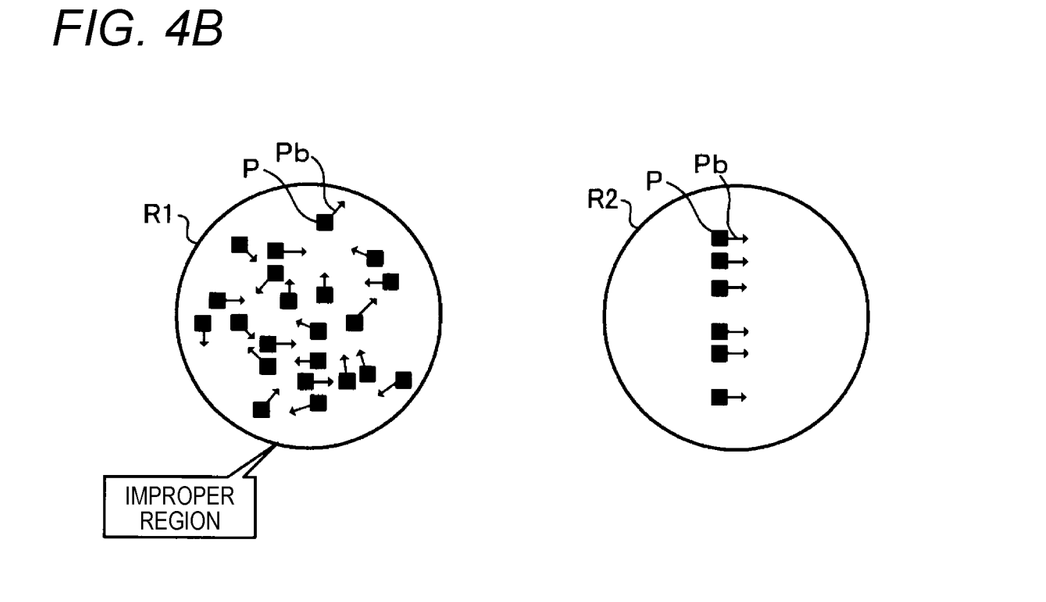
FIG. 4B shows an example of how an improper region Ri is recognized on the basis of luminance gradients.

Next, a description will be made of the case that the first judging unit 221 recognizes an improper region Ri on the basis of a dispersion pattern of luminance gradients of respective edge points.

FIG. 4B shows an example of how an improper region Ri is recognized on the basis of luminance gradients. As shown in FIG. 4B, the first judging unit 221 recognizes an improper region Ri on the basis of a dispersion pattern of luminance gradients Pb of respective edge points P in each region. That is, the first judging unit 221 recognizes an improper region Ri on the basis of the fact that a feature pattern of edge points P of a true partition line (i.e., a dispersion pattern of luminance gradients Pb of edge points P of a true partition line) and a pattern of edge points P produced by noise (i.e., a dispersion pattern of luminance gradients Pb of edge points P produced by noise) are different from each other.

More specifically, in the case of a road surface noise, as in a region R1 shown in FIG. 4B, luminance gradients Pb of edge points P produced by noise are irregular. On the other hand, in the case of a true partition line, as in a region R2 shown in FIG. 4B, luminance gradients Pb of edge points P corresponding to a partition line are in one direction.

Thus, the first judging unit 221 calculates the degree of variation of luminance gradients Pb in each region by calculating, for example, a standard deviation of the luminance gradients Pb in each region. And the first judging unit 221 judges that a region where the degree of variation is higher than a prescribed value (e.g., the region R1 shown in FIG. 4B) is an improper region Ri. The prescribed value is set in advance according to the degree of variation of luminance gradients Pb of edge points corresponding to a true partition line.

With the above processing, edge points P produced by road surface noise can be eliminated from detection of partition lines. Although in the above processing an improper region Ri is recognized on the basis of both of an edge density and luminance gradients Pb, the first judging unit 221 may recognize an improper region Ri on the basis of one of an edge density and luminance gradients Pb.

Returning to FIG. 3, the detection unit 222 will be described. The detection unit 222 detects partition line candidates (detection targets) on the basis of edge information excluding a region that has been judged to be an improper region Ri by the first judging unit 221 or the second judging unit 223.

As a result, erroneous detection of a partition line candidate can be suppressed while the processing load of detection of partition line candidates can be lowered. For example, the detection unit 222 can detect partition line candidates excluding a region that has been judged to be an improper region Ri by the first judging unit 221 or the second judging unit 223.

Since the second judging unit 223 performs judgment processing after the partition line candidate detection processing of the detection unit 222, the detection unit 222 detects partition line candidates excluding a region that was judged to be an improper region Ri by the second judging unit 223 by the preceding frame. Information relating to an improper region Ri that was judged to be an improper region Ri by the preceding frame is stored in the storage unit 3 as region information 31.

Figure 5:
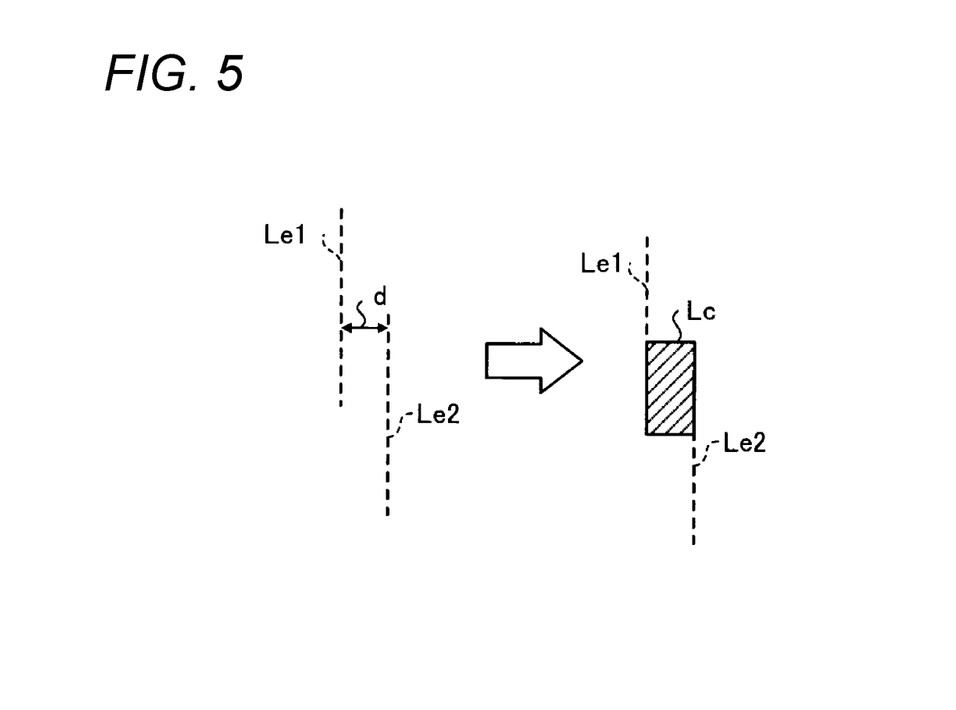
FIG. 5 a specific example partition line candidate.

A specific example of the partition line candidate detection processing of the detection unit 222 will be described with reference to FIG. 5. FIG. 5 shows a specific example partition line candidate. Although a case that both of edge lines Le1 and Le2 are a straight line will be described, they may be curved lines.

As shown in FIG. 5, the detection unit 222 detects a partition line candidate Lc from the edge lines Le1 and Le2 when they are approximately parallel with each other and the distance d between them is within a prescribed range.

The prescribed range is a range that is suitable for the line width of actual partition lines, and is, for example, a range of 5 to 10 cm. As shown in FIG. 5, the detection unit 222 detects, as a partition line candidate Lc, an overlap region of the edge lines Le1 to Le2 and the distance d is made the width of the detected partition line candidate Lc.

In other words, portions where the edge lines Le1 to Le2 do not overlap with each other are not detected as belonging to the partition line candidate Lc. This is because a partition line should be formed by a pair of edge lines Le located at its two respective side ends.

The portions where the edge lines Le1 to Le2 do not overlap with each other may be ones produced by noise. Thus, the detection unit 222 can detect only highly reliable partition line candidates Lc by not detecting, as partition line candidate Lc, the portions where the edge lines Le1 to Le2 do not overlap with each other. This makes it possible to suppress erroneous detection of a parking frame.

The detection unit 222 detects a partition line candidate Lc according to a detection condition that is based on luminance gradients of respective edge lines Le in addition to the above-described edge line Le arrangement condition. This will be described below more specifically. Where a partition line is a white line, it is expected that the luminance increases toward the center line of the white line. Thus, in this case, the edge lines Le1 and Le2 have opposite luminance gradients (i.e., the luminance increases toward the center line of the white line).

As a result, the accuracy of detection of a partition line candidate Lc can be increased by the detection unit 222's detecting, as a partition line candidate Lc, a pair of edge lines Le having opposite luminance gradients. On the other hand, there may occur a case that an actual partition line is smaller in luminance than its neighborhoods. In view of this, the detection unit 222 may detect, as a partition line candidate Lc, a pair of edge lines Le having such opposite luminance gradients that the luminance increases toward the outside.

Returning to FIG. 3, the second judging unit 223 will be described. The second judging unit 223 recognizes an improper region Ri on the basis of partition line candidates Lc detected by the detection unit 222. Whereas the first judging unit 221 recognizes an improper region Ri produced by road surface noise, the second judging unit 223 judges a grating found in image data I to be an improper region Ri.

More specifically, the detection unit 222 judges whether a target area is an improper region Ri on the basis of a detection pattern of partition line candidates Lc in the target region.

Figure 6:
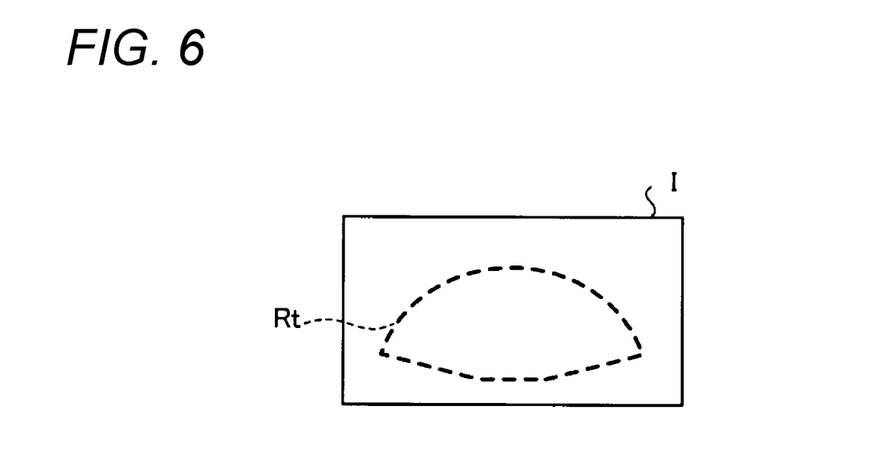
FIG. 6 shows a specific example target area.

The target area will be described with reference to FIG. 6. FIG. 6 shows a specific example target area. As shown in FIG. 6, the target area Rt occupies an approximately central portion of image data I. Thus, the target area Rt is an area where the resolution of a road surface image is higher than in the other area of image data I.

That is, the target area Rt is an area where partition lines and a grating can be detected more accurately than in the other area. Thus, the accuracy of recognition of an improper region Ri can be increased by the second judging unit 223's making a judgment as to an improper region Ri only in the narrower target area Rt.

Figure 7:
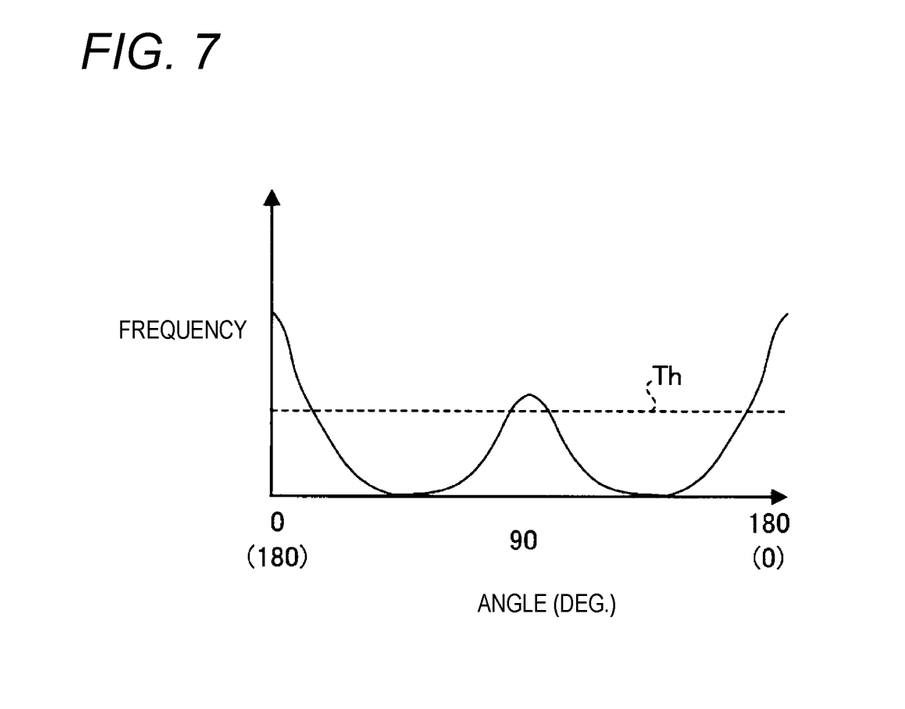
FIG. 7 shows a specific example of judgment processing of a second judging unit.

Next, a specific example of judgment processing of the second judging unit 223 will be described with reference to FIGS. 7 and 8. FIG. 7 shows a specific example of the judgment processing of the second judging unit 223. As shown in FIG. 7, the second judging unit 223 performs judgment processing on the target area Rt on the basis of a shape pattern of a histogram of angles formed by partition line candidates Lc in the target area Rt.

More specifically, an angle 0° (or 180°) occurs when two partition line candidates Lc in the target area Rt are approximately parallel with each other and an angle 90° occurs when two partition line candidates Lc in the target area Rt are perpendicular to each other. The second judging unit 223 generates a histogram of angles formed by respective pairs of partition line candidates Lc.

The second judging unit 223 judges the target area Rt to be an improper region Ri if the histogram has two peaks whose frequencies are higher than a threshold value Th. More specifically, the second judging unit 223 judges the target area Rt to be an improper region Ri if the histogram has such two peaks at positions that are spaced from each other by 90°. This is because a grating has a feature that plural angular peaks appear that reflect partition line candidates Lc that are approximately perpendicular to or parallel with each other.

On the other hand, in the case of partition line candidates Lc corresponding to true partition lines, the partition line candidates Lc produce a detection pattern reflecting that they are approximately perpendicular to or parallel with each other but no peak appears whose frequency is higher than the threshold value Th because the number of partition line candidates Lc is smaller than in the case of a grating. The threshold value Th is set in advance according to the number of actual partition lines.

As described above, the detection unit 222 can recognize an improper region Ri with high accuracy by recognizing a grating region on the basis of a shape pattern of a histogram. In other words, the detection unit 222 can discriminate between a grating and partition line candidates Lc corresponding to real partition lines.

It is possible for the second judging unit 223 to exclude a region that has been judged to be an improper region Ri in current frame processing from improper region Ri judging processing in the next and subsequent frame processing.

Figure 8:
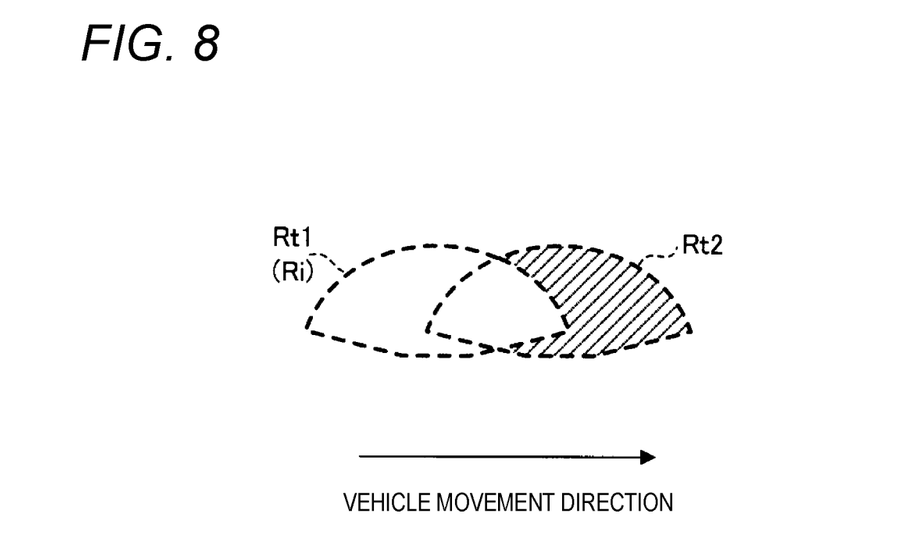
FIG. 8 shows a specific example of improper region judging processing for a next frame.

FIG. 8 shows a specific example of improper region Ri judging processing for a next frame. The following description will be made with assumptions that a target area Rt1 shown in FIG. 8 was judged to be an improper region Ri in preceding frame processing and a target area Rt2 shown in FIG. 8 is made a target area Rt in current frame processing.

In this example, the second judging unit 223 makes a judgment as to an improper region Ri excluding an overlap region of the target areas Rt1 and Rt2. That is, the second judging unit 223 makes a judgment as to an improper region Ri in a hatched region of the target area Rt2.

That is, the second judging unit 223 can restrict the area where to make a judgment as to an improper region Ri by taking over a judgment made in part of the target area Rt1 to a judgment to be made in the same region of the target area Rt2. This makes it possible to lower the processing load of the second judging unit 223.

The above processing is such that if the target area Rt1 is an improper region Ri, the overlap region of the target areas Rt1 and Rt2 is not subjected to a judgment to be made in the target area Rt2; however, the invention is not limited to this case. A past judgment relating to an overlap region of past and current target areas Rt may be taken over irrespective of a result of the past judgment made there.

Although in the above description the second judging unit 223 recognizes an improper region Ri on the basis of partition line candidates Lc, the invention is not limited to this case. The second judging unit 223 may recognize an improper region Ri on the basis of edge lines rather than partition line candidates Lc.

Figure 9:
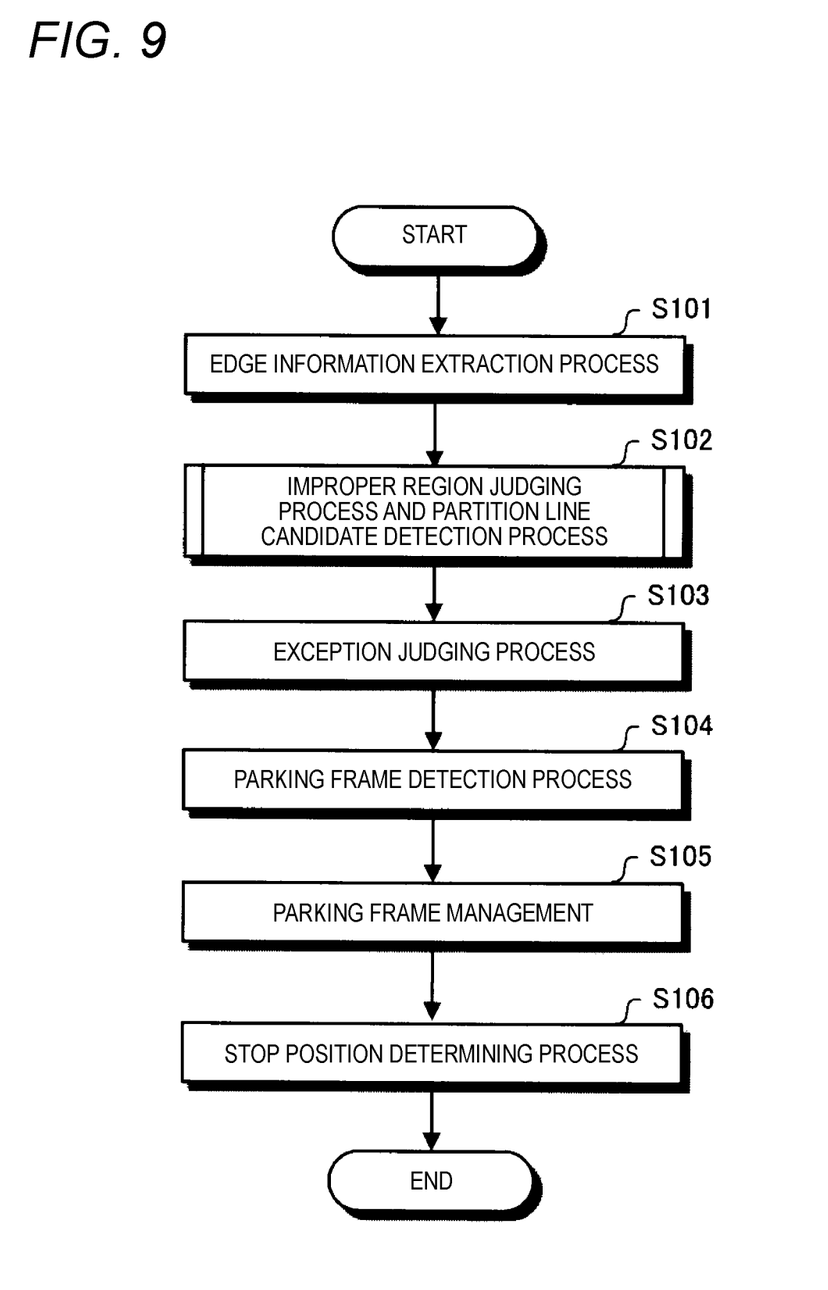
FIG. 9 is a flowchart showing the procedure of a process that is executed by the image processing device according to the embodiment.

Next, the procedure of a process that is executed by the image processing device 1 according to the embodiment will be described with reference to FIG. 9. FIG. 9 is a flowchart showing the procedure of a process that is executed by the image processing device 1. For example, this process is executed by the control unit 2 repeatedly while the vehicle speed of the vehicle C is lower than or equal to a prescribed value (e.g., 30 km/h).

As shown in FIG. 9, first, at step S101, the image processing device 1 executes an edge information extraction process of extracting edge points and edge lines from a grayscale image. At step S102, the image processing device 1 executes an improper region judging process and a partition line candidate detection process on the basis of edge information. The details of the procedure of the processes that are executed at step S102 will be described layer with reference to FIG. 10.

At step S103, the image processing device 1 executes an exception judging process of judging presence/absence of a parking prohibition region or the like on the basis of the processing results of steps S101 and S102. At step S104, the image processing device 1 executes a parking frame detection process of detecting a parking frame.

At step S105, the image processing device 1 performs parking frame management of managing the parking frame detected at step S104. At step S106, the image processing device 1 executes a stop position determining process of determining a stop position, where to stop the vehicle C, in the parking frame. Then the image processing device 1 finishes the execution of the process shown in FIG. 9.

Figure 10:
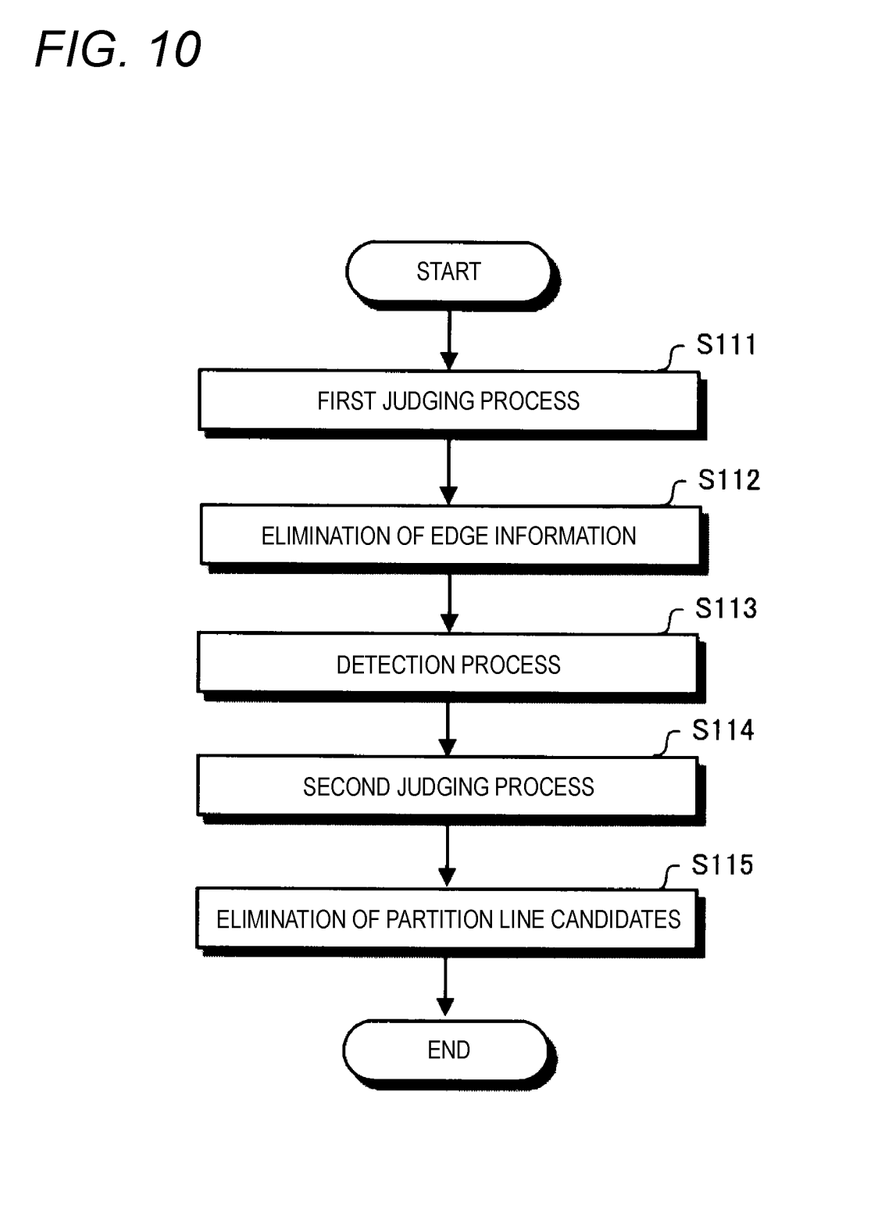
FIG. 10 is a flowchart showing the procedure of an improper region judging process and a partition line candidate detection process that are shown in FIG. 9.

Next, the procedure of step S102 shown in FIG. 9 will be described with reference to FIG. 10. FIG. 10 is a flowchart showing the procedure of the improper region judging process and the partition line candidate detection process shown in FIG. 9.

As shown in FIG. 10, first, at step S111, the improper region judging unit 22 executes a first judging process of recognizing an improper region Ri on the basis of edge densities. At step S112, the improper region judging unit 22 eliminates edge information of the improper region Ri recognized by the first judging process.

At step S113, the improper region judging unit 22 executes a process of detecting partition line candidates Lc. At step S114, the improper region judging unit 22 executes a second judging process of recognizing an improper region Ri on the basis of a histogram of angles formed by respective pairs of the partition line candidates detected at step S113.

At step S115, the improper region judging unit 22 eliminates partition line candidates Lc in the improper region Ri recognized by the second judging process. Then the improper region judging unit 22 finishes the execution of the process shown in FIG. 10. As described above, when step S113 is executed next time, partition line candidates Lc are detected excluding a region that was judged to be an improper region Ri so far by the second judging process. At stet S114, an improper region Ri is recognized excluding a region that was judged to be an improper region Ri by the preceding frame.

Although the process shown in FIG. 10 is such that both of the first judging process and the second judging process recognize an improper region Ri, the invention is not limited to this case. Only one of the first judging process and the second judging process may be used to recognize an improper region Ri.

As described above, the image processing device 1 according to the embodiment is equipped with the detection unit 222 and the first judging unit 221 and/or the second judging unit 223 (both of which are examples of the term "judging unit" used in the claims). The detection unit 222 detects a target object on the basis of edge information acquired from image data I. The first judging unit 221 and/or the second judging unit 223 judges whether a certain region in image data I is an improper region that is not suitable for detection of the target object on the basis of an edge pattern of edge information in the certain region and a feature pattern indicating a feature of the target object.

The detection unit 222 detects a target object excluding an improper region Ri recognized by the first judging unit 221 and/or the second judging unit 223. As such, the image processing device 1 according to the embodiment can suppress erroneous detection of a target object while lowering the processing load.

Although the embodiment is directed to the case that detection targets of the image processing device 1 are partition line candidates Lc, the kind of detection targets is not limited to partition line candidates Lc. That is, the kind of detection targets may be changed as appropriate. For example, where detection targets are circular objects, the image processing device 1 may judge, to be an improper region Ri, a region where many circular edge patterns are detected from image data I.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: Image processing device
21: Edge extraction unit
22: Improper region judging unit
23: Exception judging unit
24: Parking frame detection unit
25: Parking frame managing unit
26: Stop position determining unit
31: Region information
221: First judging unit (example of judging unit)
222: Detection unit
223: Second judging unit (example of judging unit)

What is claimed is:

1. An image processing device comprising:
   a processor and associated memory configured to:
      detect a target object based on edge information acquired from image data; and
      judge whether a certain region in the image data is an improper region that is not suitable for detection of the target object based on an edge pattern of edge information in the certain region and a feature pattern indicating a feature of the target object,
   wherein the processor is further configured to:
      detect the target object excluding a region that has been judged to be the improper region;
      detect, as the target object, partition line candidates that are candidates for partition lines that partition a parking frame; and
      judge whether the certain region is the improper region based on a shape pattern of a histogram of angles formed between the detected partition line candidates.

2. The image processing device according to claim 1, wherein the processor is configured to judge that the certain region is the improper region in a case where the shape pattern of the histogram is different from a shape pattern of a histogram indicating a feature of the partition line candidates as the object.

3. The image processing device according to claim 2, wherein the processor is configured to judge whether the certain region is the improper region based on a distribution pattern of edge points included in the edge information.

4. The image processing device according to claim 3, wherein the processor is configured to judge that the certain region is the improper region in a case where the distribution pattern of the edge points is different from a distribution pattern of edge points indicating a feature of the target object.

5. The image processing device according to claim 2, wherein the processor is configured to judge whether the certain region is the improper region based on a dispersion pattern of luminance gradients of edge points included in the edge information.

6. The image processing device according to claim 5, wherein the processor is configured to judge that the certain region is the improper region in a case where the dispersion pattern of the luminance gradients of the edge points is different from a dispersion pattern of luminance gradients of edge points indicating a feature of the target object.

7. The image processing device according to claim 1, wherein the processor is configured to judge whether the certain region is the improper region based on a distribution pattern of edge points included in the edge information.

8. The image processing device according to claim 7, wherein the processor is configured to judge that the certain region is the improper region in a case where the distribution pattern of the edge points is different from a distribution pattern of edge points indicating a feature of the target object.

9. The image processing device according to claim 1, wherein the processor is configured to judge whether the certain region is the improper region based on a dispersion pattern of luminance gradients of edge points included in the edge information.

10. The image processing device according to claim 9, wherein the processor is configured to judge that the certain region is the improper region in a case where the dispersion pattern of the luminance gradients of the edge points is different from a dispersion pattern of luminance gradients of edge points indicating a feature of the target object.

11. The image processing device according to claim 1, wherein the processor is configured to judge whether the certain region is the improper region excluding a region that was judged to be the improper region in past image data.

12. An image processing device comprising:
   a processor and associated memory configured to:
      detect a target object based on edge information acquired from image data; and
      judge whether a certain region in the image data is an improper region that is not suitable for detection of the target object based on an edge pattern of edge information in the certain region and a feature pattern indicating a feature of the target object,
   wherein the processor is further configured to:
      detect the target object excluding a region that has been judged to be the improper region; and
      judge whether the certain region is the improper region based on a distribution pattern of edge points included in the edge information.

13. The image processing device according to claim 12, wherein the processor is configured to judge that the certain region is the improper region in a case where the distribution pattern of the edge points is different from a distribution pattern of edge points indicating a feature of the target object.

14. The image processing device according to claim 12, wherein the processor is configured to judge whether the certain region is the improper region based on a dispersion pattern of luminance gradients of edge points included in the edge information.

15. The image processing device according to claim 14, wherein the processor is configured to judge that the certain region is the improper region in a case where the dispersion pattern of the luminance gradients of the edge points is different from a dispersion pattern of luminance gradients of edge points indicating a feature of the target object.

16. An image processing method characterized by comprising:
   a detection step of detecting a target object based on edge information acquired from image data; and
   a judging step of judging whether a certain region in the image data is an improper region that is not suitable for detection of the target object based on an edge pattern of the edge information in the certain region and a feature pattern indicating a feature of the target object, wherein:
   the detection step detects the target object excluding a region that has been judged to be the improper region by the judging step;
   the detection step detects, as the target object, partition line candidates that are candidates for partition lines that partition a parking frame; and
   the judging step judges whether the certain region is the improper region based on a shape pattern of a histogram of angles formed between the detected partition line candidates.

17. An image processing method characterized by comprising:
   a detection step of detecting a target object based on edge information acquired from image data; and
   a judging step of judging whether a certain region in the image data is an improper region that is not suitable for detection of the target object based on an edge pattern of the edge information in the certain region and a feature pattern indicating a feature of the target object, wherein:
   the detection step detects the target object excluding a region that has been judged to be the improper region by the judging step; and
   the judging step judges whether the certain region is the improper region based on a distribution pattern of edge points included in the edge information.

* * * * *